United States Patent
Hoffmann et al.

(10) Patent No.: US 7,680,945 B2
(45) Date of Patent: Mar. 16, 2010

(54) MESSAGING PROTOCOL IN ENTERPRISE APPLICATIONS

(75) Inventors: Frank Oliver Hoffmann, Wiesloch (DE); Juergen Frank, Landenburg (DE); Steven T. Winkler, Heidelberg (DE); Christoph Hofmann, Wiesloch (DE)

(73) Assignee: SAP AG, Walldorf (DE)

( * ) Notice: Subject to any disclaimer, the term of this patent is extended or adjusted under 35 U.S.C. 154(b) by 1142 days.

(21) Appl. No.: 10/816,445

(22) Filed: Mar. 31, 2004

(65) Prior Publication Data

US 2005/0226240 A1  Oct. 13, 2005

(51) Int. Cl.
   *G06F 15/16* (2006.01)
(52) U.S. Cl. .............. 709/230; 709/203; 709/204; 709/223; 719/316
(58) Field of Classification Search .............. 705/9; 707/6; 709/203, 204, 205, 223, 225; 717/116; 719/316
See application file for complete search history.

(56) References Cited

U.S. PATENT DOCUMENTS

2002/0138618 A1* 9/2002 Szabo ................ 709/225
2002/0184070 A1* 12/2002 Chen et al. ................ 705/9
2002/0184357 A1* 12/2002 Traversat et al. ............ 709/223
2003/0014733 A1* 1/2003 Ringseth et al. ............ 717/116

OTHER PUBLICATIONS

SAP Exchange Infrastructure (BC-XI) Release XI 2.0 SR1 (Mar. 28, 2003).
Exchange Infrastructure 2.0 Development and Configuration Workshop—Runtime (Feb 17, 2002).

* cited by examiner

*Primary Examiner*—Ramy M Osman
*Assistant Examiner*—Marshall McLeod
(74) *Attorney, Agent, or Firm*—Mintz, Levin, Cohn, Ferris, Glovsky and Popeo, P.C.

(57) ABSTRACT

Methods and apparatus, including computer systems and program products implementing a messaging protocol. The messaging protocol may be a messaging protocol for transporting a message across a messaging landscape in a collaborative network. Techniques include sending a message that is defined to include a structured message header with information related to at least one component from a set of components defined by a protocol, including protocol version information in a message such that a component of a messaging landscape can interpret the message based on the version information, defining a message as one of a class of messages, end-to-end acknowledgement for messages, and security for headers and payloads of messages.

20 Claims, 5 Drawing Sheets

```
<SAP : Main SOAP : mustUnderstand="1" wsu : Id="4711"
       SAP : versionMajor=3 SAP : versionMinor=0>         210
   <SAP : MessageClass> ApplicationMessage</SAP : MessageClass>     215
   <SAP : ProcessingMode> asynchronous</SAP : ProcessingMode>   220
   <SAP : MessageId> 449219F1-A519-11D7-C936-FB350A135031</SAP : MessageId>   205
   <SAP : TimeSent> 2003-06-23T01 : 23 : 17Z</SAP : TimeSent>

<SAP : Sender>
   <SAP : Party agency="016" scheme="DUNS">114315195</SAP : Party>
   <SAP : Service> SRM1</SAP : Service>
   </SAP : Sender>
   <SAP : Receiver>
   <SAP : Party SAP : agency="016" SAP : scheme="DUNS">
          007321904
   </SAP : Party>
   <SAP : Service> Sales</SAP : Service>
   </SAP : Receiver>
   <SAP : Interface SAP : namespace="http : //sap . com/ABC">
          Order_Out
   </SAP : Interface>
</SAP : Main>
```

| Header | Message Class | | |
|---|---|---|---|
| | Application-Message | Application-Response | ApplicationError |
| Main | X | X | X |
| Error | — | — | X |
| ReliableMessaging | X | — | — |
| Ack | — | — | — |
| HopList | Conditional: If TransportAckRequested or ApplicationAckRequested is Equal True | — | — |
| Security | Conditional: If Authentication Required | Conditional: If Authentication Required | — |
| Diagnostic | Conditional | Conditional | Conditional |
| Type | | | |
| 'Application' | X | X | Conditional: Depends on Application |
| 'ApplicationAttachment' | Conditional: If Attachment Provided by Sender | Conditional: If Attachment Provided by Sender | — |
| 'System' | Conditional: If Message Tracing is Switched On | Conditional: If Message Tracing is Switched On | Conditional: If Message Tracing is Switched On |
| Protocol Invariants | | | |
| Main/ProcessingMode | Synchronous, Asynchronous | Synchronous | Synchronous |
| Main/RefToMessageId | Arbitrary, But Must be Valid MessageId of Another ApplicationMessage | Must be the MessageId of the Corresponding ApplicationMessage | Must be the MessageId of the Corresponding ApplicationMessage |
| Error/Code | N/A | N/A | 'APPLICATION' |
| Error/Fault | N/A | N/A | Applications Fault Interface |

FIG. 3

MESSAGING PROTOCOL IN ENTERPRISE APPLICATIONS

BACKGROUND

Companies face an increasing need for integration of, and collaboration among, their information and enterprise software systems and with their business partners. In many software system landscapes, application components are directly connected in a one-to-one relationship with other application components, and integration capabilities are hardwired into the application components. Under these conditions, upgrades, changes, or extensions to an information and enterprise software system is challenging and resource-intensive, and adversely affects collaborative sharing of information.

New electronic business collaboration typically demands connectivity among applications inside and outside of company boundaries. Networks such as the Internet provide opportunities for systems to communicate almost instantaneously with other systems or individuals. Business processes that once were restricted to intranets and their users are now moving to the Internet to become an effective composition of Web services. A Web service is a programmable, self-contained, self-describing, modular application that can be published, discovered or invoked through an open Internet standard.

Processes such as supply chain planning, sourcing, and demand forecasting are automated across enterprises and within regions, and might be implemented across systems with only marginal communication costs. To achieve this result, components from different vendors might be integrated into a consistent infrastructure. And, in order to achieve an integrated infrastructure, technical connectivity might be provided among the different components of the system.

While technical connectivity can be provided using open protocols and standards like the hypertext transfer protocol (HTTP) and extensible markup language (XML), integration of a company's business applications and web services with other parties' software platforms requires a message communication protocol that defines message communication between enterprise system components, yet utilizes open and widely accepted standards for adaptation to new technology.

SUMMARY

Disclosed herein are methods and apparatus, including computer program products, that implement a messaging protocol.

In one general aspect, the messaging protocol features a method of transporting a message from a sending application to a receiving application, across a messaging landscape in a collaborative network. That method includes defining a message to include a structured message header, which is defined in accordance with a protocol such that the structured message header includes information related to at least one component from a set of components defined by the protocol; sending the message according to the protocol, from the sending application; and receiving the message at the receiving application. The protocol further defines the header to include information related to a processing mode for the message and security for components of the message.

Implementations may include one or more of the following features. The method may further include defining the message to include a message body, which is defined in accordance with the protocol such that the message body includes at least one component from a second set of components defined by the protocol and the protocol defines the second set of components to include a fault message component representing an error occurring at a messaging peer that generated the error. The fault message may be defined to represent at least one error from a set of errors and the protocol may define the set of errors to include errors processing a message, errors parsing a message, and errors rendering a message. The security for components of the message may be defined to include information related to a signature of the message and information related to a signature of a payload of the message, if the message includes the payload.

In another aspect, a method of transporting a message from a sending application to a receiving application, across a messaging landscape in a collaborative network, includes defining a message to include version information, such that the version information indicates a protocol used to define the message; sending the message according to the protocol; and receiving the message at a messaging component in the messaging landscape. In that case the messaging component is operative to process the message based on the version information included in the message.

Implementations may include one or more of the following features. The version information may include a major version and a minor version. The messaging component may be operative to process the message if the major version is less than or equal to a major version for which the messaging component is configured. The messaging component may be operative to process the message regardless of the minor version of the message. In that case, the messaging component is operative to optimally process the message if the minor version of the message is less than or equal to a minor version for which the messaging component is configured.

In another aspect, a method of transporting a message from a sending application to a receiving application, across a messaging landscape in a collaborative network, includes defining a message to include addressing information such that the addressing information is defined in accordance with a protocol; sending the message, from the sending application, according to the protocol; and receiving the message at the receiving application. In that method, the protocol defines addressing information to include party information for the sending application and the receiving application, and the party information to include identification of a party that is a business party or an agency as defined by a scheme.

In another aspect, a method of transporting a message from a sending application to a receiving application, across a messaging landscape in a collaborative network, includes defining a message according to a class of messages; sending the message, from the sending application, according to the protocol; and receiving the message at the receiving application. In that method, the class of messages is one of a plurality of classes of messages that are defined by a protocol.

In another aspect, a method of transporting a message from a sending application to a receiving application, across a messaging landscape in a collaborative network, includes receiving a message, from the sending application, at a first component of the collaborative network; in response to the first component successfully receiving the message, the first component sending a transport level acknowledgement to the sending application; the first component modifying the message to include the first component on a hop-list in the message; the first component causing the message to be sent to the receiving application; in response to receiving an acknowledgement message, from a second component, indicating that the message has been received by the receiving application, the first component sending a transport level acknowledgement to the second component.

In alternative implementations, causing the message to be sent to the receiving application may include the first component sending the message to one of one or more components in the collaborative network. In that case, each component is operative to send a transport level acknowledgement, in response to successfully receiving the message; cause the message to be sent to the receiving application; include the component on the hop-list in the message by modifying the message; generate the acknowledgement message if the component sends the message to the receiving application; send the acknowledgement message if the component sends the message to the receiving application; and send a transport level acknowledgement in response to successfully receiving the acknowledgement message.

The messaging protocol and related mechanisms and/or techniques described here may provide one or more of the following advantages.

A messaging protocol may be defined to include a structured message header. Thus, rather than being disorganized and difficult to parse, the structured message header allows for messages to be easily and intelligently interpreted by an application. The messaging protocol defines messages according to different classes. By having different classes, messages may be generated in accordance with the semantics corresponding to a message class and messaging peers may be able to quickly identify a message and understand how to handle it. Also, the message protocol supports end-to-end acknowledgement of asynchronous messaging, to ensure that messages are received at a receiving peer.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 2 is a diagram of a main header.
FIG. 3 is part of a table of message classes.

DETAILED DESCRIPTION

The systems and techniques described here relate to a messaging protocol for enterprise systems and business partners.

Implementations of the messaging protocol include a message header that specifies attributes of the message. Attributes may include a description of message content, or a specification of how the message is to be handled and/or processed. The message header may be divided into multiple sections (i.e. components or sub-headers), each of which specifies various attributes of the message. For example, a message header may include a main header section and a reliable messaging header section. The messaging protocol may further define the use of a number of processing modes, such as asynchronous or synchronous communications, for transmission of a message in accordance with one or more of those processing modes.

The messaging protocol may also include security protocols, for secure transmission and/or encryption of a message. Any number of programming languages and/or techniques, such as XML, can be used to implement the protocol. The protocol may be implemented in a system including a sending application, a receiving application, and any number of messaging peers. A messaging peer is a component of the messaging landscape that might handle a message and may be, for example, a server computer system. These and other aspects will now be explained in further detail.

Message Header Structure

Figure 1:
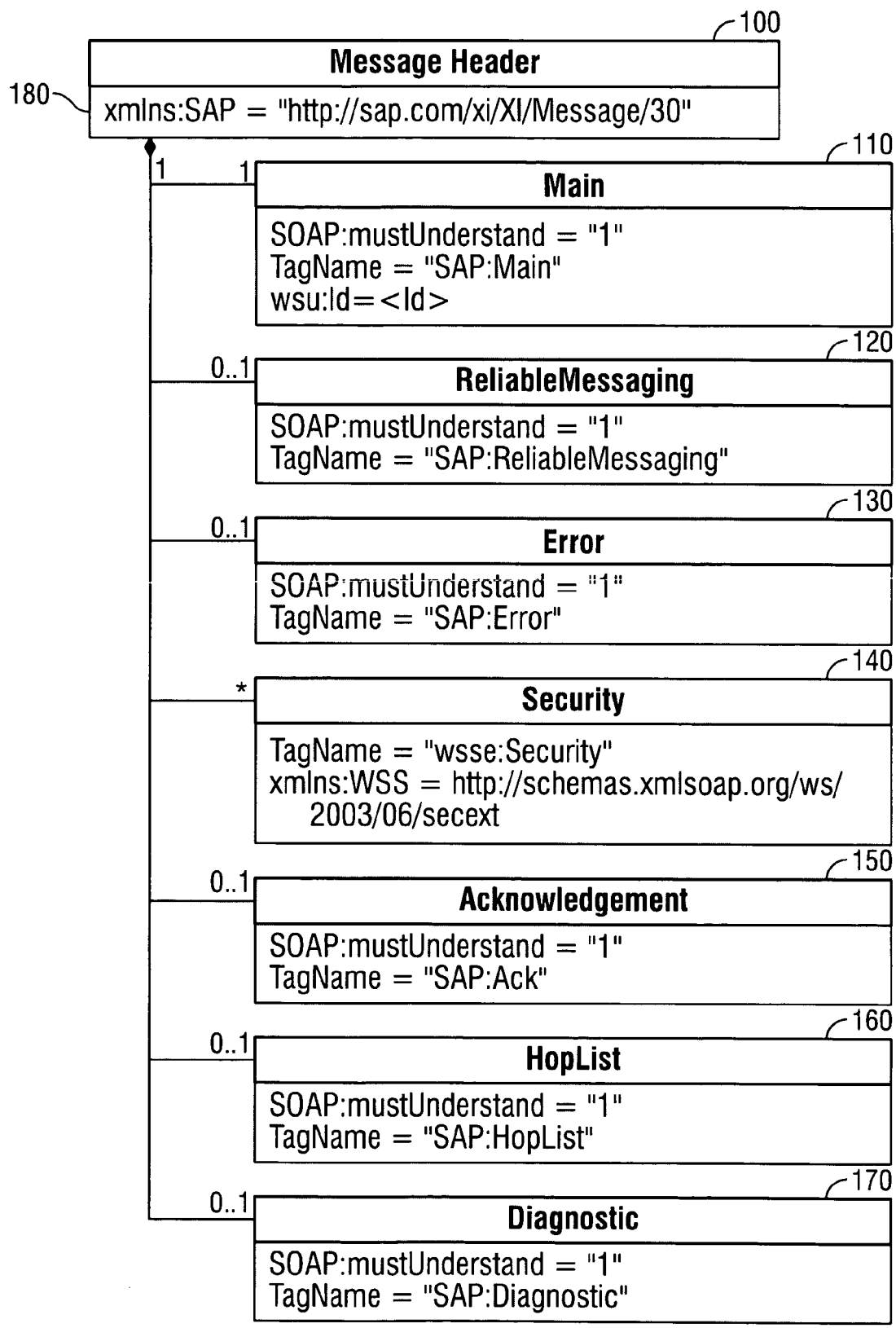
FIG. 1 is a diagram of a message header.

FIG. 1 is a diagram of a message header 100 with components of a message specified in message header sections 110-170. Each of the components of the message is defined by a messaging protocol. Thus, if an application receives a message with a message header that is composed in accordance with the messaging protocol, the receiving application can interpret the header in order to understand sections of the message. A main header section 110 specifies global attributes of the message; i.e. attributes that apply throughout the message. A reliable messaging section 120 specifies mechanisms and/or techniques that guarantee the transport of a message with certain qualities of service (QoS). Qualities of service may include mechanisms and/or techniques to guarantee delivery of a message, detect duplicates of a message, and deliver multiple messages in a particular sequence. An error section 130, which might be included in an error message, specifies information related to an error, such as the category of error and error code. A security section 140 specifies security mechanisms and/or techniques that are used to handle the message, including information related to digital signatures and encryption. An acknowledgement section 150 specifies mechanisms and/or techniques used to send an acknowledgement of the receipt of a message. In the case that an acknowledgement message is requested, a hoplist section 160 may assist the sending of the acknowledgement message by specifying a path from the original sender to the final receiver. A diagnostic section 170 may be used to specify diagnostic information, such as a trace of the code processed to handle the message and a log of the process for storing the message. In alternative implementations, different, additional, and/or fewer components may be specified by the messaging protocol and/or included in a message header 100.

The messaging protocol that defines the header 100 may require that applications implementing the protocol be capable of differentiating among different types of message headers, such as message headers defined in open standards for messaging, message headers used within and processed in accordance with the messaging protocol (e.g. a message header for security), and message headers of messages that do not conform to the protocol and are not necessarily processed by systems conforming to the protocol. The messaging protocol of header 100 may use any number of attributes to allow a system to determine the protocol corresponding to the message header. These attributes may exist in the header section, or alternatively, in any section of the message. For example, the namespace attribute 180 can be used to specify a protocol version to which the header 100 belongs.

Main Header Structure

FIG. 2 is an example of the main header 200 of a message, with attributes 205-225. The main header 200 is a section of a message header, such as the main header section 110 is a section of the message header 100, and defines global attributes for a message. The attributes of the message include a unique identifier 205 for the message, a version information 210 of the message, a message class 215 of the message, a processing mode 220 for the message, references (not shown) to other messages, a "conversation" (not shown) related to the message, and sender/receiver information 225 about the sender and/or receiver of the message. In alternative implementations the main header 200 may include additional and/or different attributes.

The unique identifier 205 allows each message to be uniquely identifiable within the overall messaging landscape. Each message can have a unique identifier 205. The unique identifier 205 may be generated by the sender of the message according to a standard for generating global unique identifiers, such as the ISO-11578 Standard. The standard should be used to guarantee uniqueness of the identifier 205. While a message travels from the sender to its final receiver, traversing some number of messaging peers, i.e. other components of the system capable of handling the message, its identifier 205 should remain the same as the identifier generated by the sender. In contrast, other header data can be transformed by components between the sender and the final receiver. For example, a list of components that handle the message, such as a hop-list, may be modified by each component that handles the message. Also, in the case that a message is split at a component that handles messages, such as a server, a new identifier 205 may be created for each split message whereas the original message is stopped at that component.

The version information 210 of a message indicates the version of the messaging protocol corresponding to the message. The version information 210 includes two sections: a major version and a minor version. The value for the major version indicates compatibility of systems using a major version of the same or greater value than the major version of the message. Systems conforming to a higher version number should be compatible with messages conforming to a lower major version because a system using the messaging protocol should be backwards compatible. By contrast, differences in the minor version number do not necessarily indicate incompatibility. For example, a system using a lower major version number than a message expresses that the protocols are incompatible, while differences of the minor number may still be compatible. If the major version of a message is higher than the major version corresponding to a system implementing the protocol, the implementation should respond with an error message. A system implementing the protocol may optimize the processing of messages based on the minor version number, or simply log the difference in an appropriate logging environment. The presence of an explicit message version number in the message itself allows a component handling the message to evaluate the version dependencies without parsing the entire message. The versioning information which may be included in a message header may implicitly define the version of other parts of the message. For example, a message header with the version 4.0 may implicitly define that attachments to the message conform to version 4.0.

In alternative implementations, the version information 210 may be any indicator and need not include information relating to both the major or minor version corresponding to the messaging protocol. Also, the system implementing the protocol need not be backwards compatible, or may only be backwards compatible with certain versions. In that case, an error message may be sent indicating that a message does not conform to the major version of the system implementing the protocol. Also, in alternative implementations the version corresponding to the system implementing a messaging protocol may differ from the version of the messaging protocol corresponding to a message. For example, a system with version number 4.0 may correspond to a message conforming to a messaging protocol with a version number 5.0. In that case, the system may use other mechanisms and/or techniques to determine if a message is compatible with the system.

The attribute for the message class 215 defines a message type. The messaging protocol 200 may include a number of different classes of messages, such as ApplicationMessage, ApplicationResponse, ApplicationAck, SystemAck, ApplicationError and SystemError. Messages of different message classes may have different attributes in the message header and may be invariants of the messaging protocol that have different behaviors. For example, depending on the message class, a specific subset of message headers and payloads may be required. In alternative implementations additional and/or different message classes may be defined for the messaging protocol.

The processing mode 220 for the message indicates whether a message should be processed synchronously or asynchronously. In synchronous processing the sender of a message waits until a response arrives so that the sender is aware of the status of the message. Thus, if a message is processed synchronously, a message, such as a response or error message, will be transmitted to the sender. By contrast, in asynchronous processing, the sender need not expect a response. However, if a message is processed asynchronously, the sender may request an acknowledgement, either contemporaneously with the message, or at some other time.

In an example, a message such as an ApplicationMessage may be sent using synchronous processing. The message may cause some application functionality to be executed in the receiver system. After the execution has taken place, a response message, such as ApplicationResponse or ApplicationError, may be sent from the receiver to the original sender. If the message was sent using asynchronous processing, an acknowledgement message, such as SystemAck and/or ApplicationAck, may only be sent if the original sender had requested an acknowledgement.

A message such as a system acknowledgment message (i.e. SystemAck) may be used to provide reliable messaging of asynchronous processing. System acknowledgement messages may be returned as synchronous hop-to-hop acknowledgments, such that a previous messaging peer is signaled that the next messaging peer has successfully received an asynchronous message. A messaging peer is a component of the messaging landscape that can handle the transport of a message. A next messaging peer is the next messaging peer in a series of messaging peers that handle a message, from the sender to the receiver, whereas the previous messaging peer is the messaging peer prior to the next messaging peer in that series of messaging peers.

In accordance with certain implementations of the messaging protocol, a sender can request an asynchronous acknowledgement message for a message processed asynchronously. If an asynchronous acknowledgement message is requested, an acknowledgement message is sent back to the sender. The acknowledgement message may be from a portion of the system implementing the protocol, and/or from the application that receives and/or processes the message, such as an ApplicationAck message. Thus, an asynchronous SystemAck message can be used as an end-to-end delivery acknowledgment, whereas the ApplicationAck reflects the status of the application processing the message. Either acknowledgement message can report successful and/or unsuccessful processing.

The message main header may include any number of references (not shown) to other messages. The references may be used to indicate related messages. For example, a reference might be included in an error message to indicate the message corresponding to the error message. In order to indicate another message, the unique identifier assigned to a message may be used.

The message main header may indicate that the message is related to any number of "conversations" (not shown). A conversation may represent a group of any number of related messages. For example, a conversation may be named "Business Luncheon." By relating a message to the conversation, components that implement the messaging protocol and/or users of that system may differentiate among those messages and group them accordingly. A conversation may provide more sophisticated communication patterns than simple request/response communication patterns. For example, all messages that refer to the same conversation may belong to the same business process.

The main header 200 includes sender/receiver information 225 about the sender and/or receiver of a message. The information 225 about the sender and receiver of a message may be grouped into respective subsets of information. Each subset may contain a party and/or service. A combination of party and service may uniquely define a message sender respective to an intended message receiver, or vice versa.

The party attribute represents a party, such as a business partner, and can be identified by one of a number of different types of identifiers. For example, standardized identifiers may be used, like the DUNS numbers provided by Dun & Bradstreet, bilaterally or multilaterally defined identifiers, or identifiers proprietary within one application system. Two attributes, such as agency and scheme, may further define the party attribute by providing information on the type of identifier represented by the value of the party attribute. The following is an example of a sender/receiver using the scheme attribute:

<SAP:Sender>
   <SAP:Party agency="016" scheme="DUNS">114315195</SAP:Party>
   <SAP:Service>Purchasing</SAP:Service>
   </SAP:Sender>
   <SAP:Receiver>
   <SAP:Service>SRM1</SAP:Service>
   </SAP:Receiver>

In the example, the sender is an agency defined by the value "016" in accordance with the DUNS scheme and "114315195" uniquely identifies the sending party. The receiver of the message would be the service "SRM1."

The service attribute of a sender and/or receiver element may be defined by any of a number of techniques. For example, the service attribute within a specific message may represent one of three different entities: a business system, a business process, or some freely defined identifier that is typically used in a business-to-business interaction between business partners. The significance of the service attribute may be limited to certain circumstances, such as internal processing within a system that implements the messaging protocol.

Message Classes

According to the messaging protocol, any of a number of message classes may be used to define derivative invariants of the messaging protocol. Each message class may be defined in view of the main purpose of a message. For example, messages may be defined in accordance with the classes ApplicationMessage, ApplicationResponse, ApplicationError, SystemAck, ApplicationAck, or SystemError. For those classes, ApplicationMessage may be a message that is sent to an application, ApplicationResponse may be a message that synchronously responds to an ApplicationMessage (e.g. a return value in response to an ApplicationMessage that requests a calculation by a component), ApplicationError may be a message that includes an error in response to an ApplicationMessage that was caused by an application program, SystemAck may be a message acknowledging that a message has been received by a component of the system that implements the messaging protocol, ApplicationAck may be a message that informs the sender of the message about a successful or erroneous application execution of an ApplicationMessage at the final recipient, and SystemError may be a message that includes an error indicating that a system component generated an error.

Messages of different message classes may differ in the set of message attributes and/or header sections included and their protocol invariants. FIG. 3 illustrates an example of message header variations for the message classes ApplicationMessage, ApplicationResponse, and ApplicationError. In the table of FIG. 3, 'X' may represent that a header is required, '-' may represent that the header is not required but may be used, and the conditional phrases may represent that the header may be required in certain conditions. For example, messages defined in accordance with the ApplicationMessage class are required to have a reliable messaging header, whereas such a header is not required for a message defined in accordance with the ApplicationResponse class.

The content of a message may depend on the message class. For example, some classes of messages may be defined to include business data while others may be defined to exclude business data. In another example, the message classes ApplicationMessage, ApplicationResponse or ApplicationError may define messages that transport business data, while SystemAck, ApplicationAck, or SystemError may define messages that do not transport business data.

The behavior of the system in response to the message may vary depending on the message class and/or the attributes that depend on the message class. For example, the types of responses generated in response to a message may vary depending on the type of processing chosen for a message, which in turn depends on the message class and message attributes. For instance, an ApplicationMessage might be sent either synchronously or asynchronously from a sender to a receiver in order to execute some application functionality in the receiver system. After the execution has taken place, an ApplicationResponse or ApplicationError message can be sent from the receiver to the original sender of the message only if synchronous processing was chosen for the ApplicationMessage. In asynchronous processing mode and if requested, a SystemAck and/or ApplicationAck message is sent from the receiver to the original sender.

Hop to Hop Communication

A hop list header may be used to record the path from the original sender to the final receiver. After a message reaches its final destination, the hop list may be used to ensure that the path that is used for an acknowledgment message is the same path that was used to send the message to the destination. For example, an asynchronous request message may accumulate data of each messaging peer the message traverses from a sender to the final receiver. This information may reside in an attribute of the header or in a section of the header, such as the hop list header.

The hop list represents the path of a message by recording hops, each of which represents a messaging peer through which the message has passed. The hop list, for example, may include a list of individual hop tags in a hop list header. In that example, each messaging peer may add a tag to the hop list before sending the message to the next messaging peer. In this fashion, any messaging peer can determine the preceding messaging peer by looking up the last hop tag in the hop list header. Each tag that represents a hop may include, for example, a time stamp indicating the time the message arrives at the hop and a "visited" attribute indicating whether the messaging peer that represents the hop tag was visited. In order to traverse the hop list in the reverse direction, the visited attributed may be set to zero when the hop tag was generated and that attribute may then be changed to 1 when returning along the path represented by the hop list. A hop tag might also include attributes for the message identifier and information related to branching of messages to ensure that branched messages are properly traversed back to the sender and the references to those messages are set correspondingly.

Reliable Messaging

A messaging protocol may include conventions for reliable messaging, which may be defined as a "reliable messaging" header of a message. Reliable messaging describes mechanisms that guarantee message transport with certain qualities of service (QoS). QoS's include guaranteed delivery, duplicate detection, and ordered delivery (serialization, i.e. delivering messages in the intended sequence). Different techniques can be used to enforce certain QoS's. These techniques may be based on end-to-end acknowledgements (i.e. acknowledging receipt of a message) or based on QoS patterns such as "best effort," "exactly once" (EO), or "exactly once in order" (EOIO). In accordance with best effort, a message is sent to the receiver without a guarantee of delivery, duplicate detection, or guarantee of ordered delivery. In accordance with EO, a message is sent to the receiver exactly one time. This pattern does not contain a serialization context, thus ordering cannot be performed. However, for EO communication, delivery of the message to the next hop exactly one time (i.e. next messaging peer) is guaranteed. The guarantee may be enforced by retry mechanisms, retry services, and/or duplicate detection mechanisms. EOIO communication is an extension of EO, but includes ordered delivery of a message (i.e. messages are received exactly once and in the order in which they were sent).

The QoS pattern may be chosen for a message and made part of the reliable messaging header. As described earlier, the messaging protocol may define a message to include asynchronous or synchronous processing of a message. The selection of a QoS pattern may be limited based on the processing mode. For example, if the message is to be processed synchronously, then its QoS might be best effort. Whereas, if the message is to be processed asynchronously the QoS pattern might be EO or EOIO. Therefore, the combination of processing modes and QoS patterns may include synchronous best effort processing, asynchronous EO processing, and asynchronous EOIO processing.

For asynchronous message processing, a sender's asynchronous message execution stops with delivery to the next peer, which may or may not be a final receiver. In order to determine if the message has arrived at the final receiver, and how that message has been executed by the final receiver (i.e. the final receiver application), the sender can request both an asynchronous system acknowledgment (i.e. a message defined by the message class SystemAck) and/or an asynchronous application acknowledgement (i.e. a message defined by the message class ApplicationAck).

Either type of acknowledgement may be in response to any of a number of events. Those events may generally be described as:

(a) an internal system error has occurred in the system that implements the messaging protocol and the error occurred before the message has been delivered to the final receiver application, (b) the message has been successfully delivered to the final receiver, (c) the final receiver's application has been successfully executed, and/or (d) the final receiver's application has been executed and an application error has been generated.

The events (a) and (b) may be signaled by a SystemAck message whereas events (c) and (d) may be signaled by an ApplicationAck message. In order to define a message that requests acknowledgement messages upon the occurrence of any of these events, the messaging protocol may be defined to include a number of attributes, each corresponding to a scenario. Thus, in order to enforce system acknowledgement about QoSs, any of a number of attributes may be set. For example, the attributes can include SystemErrorAckRequested (i.e. a system error acknowledgement message is requested), SystemAckRequested, (i.e. a system acknowledgement message is requested) ApplicationAckRequested (i.e. an application acknowledgement message is requested) and ApplicationErrorAckRequested (i.e. an application error acknowledgement message is requested).

An acknowledgement message that is sent back to the original sender of the message includes an attribute indicating the message for which the acknowledgement is sent. An acknowledgment message may be sent back asynchronously from the receiver to the sender by traveling the same route on which the corresponding message traveled from the sender to the receiver. In order to ensure that the same route of messaging peers is followed, a hop-list of a message is copied into the acknowledgment message, and each messaging peer along the route of the acknowledgement may mark that the acknowledgement message was handled by that messaging peer. Because messages might branch (i.e. split into two or more messages), the attribute indicating the original message from which a message was sent might change to correspond to the message identifier of the message that was at each messaging peer. Thus, while an acknowledgment message travels back from the receiver to the sender, the reference identifier may be changed to the corresponding parent message identifier based on the message branch. Also, because a message that is branched generates several new messages, an acknowledgment message may be sent to the sender for each branched message.

Behavior of Acknowledgement Messages

Although many different types of acknowledgement messages have been described, the following description relates to positive system acknowledgement messages. An acknowledgement message is considered positive, as opposed to negative, if the corresponding message was successfully received. The message is further considered a system acknowledgement message if the message was received at the intended recipient. Further, an acknowledgement message is an application acknowledgement message if the message was successfully executed at the intended application.

In any case involving acknowledgement messages, all involved messaging peers can send an acknowledgment message in accordance with a recorded hop-list.

Positive SystemAck Messages

An asynchronous positive system acknowledgement message may be processed in accordance with either of the two following methods. As a first alternative, a system acknowledgement message is generated after the final receiver has signaled to its previous messaging peer that the message has been persisted. As a second alternative, a system acknowledgement message is generated at about the same time the previous messaging peer is signaled that the message has been persisted.

Figure 4:
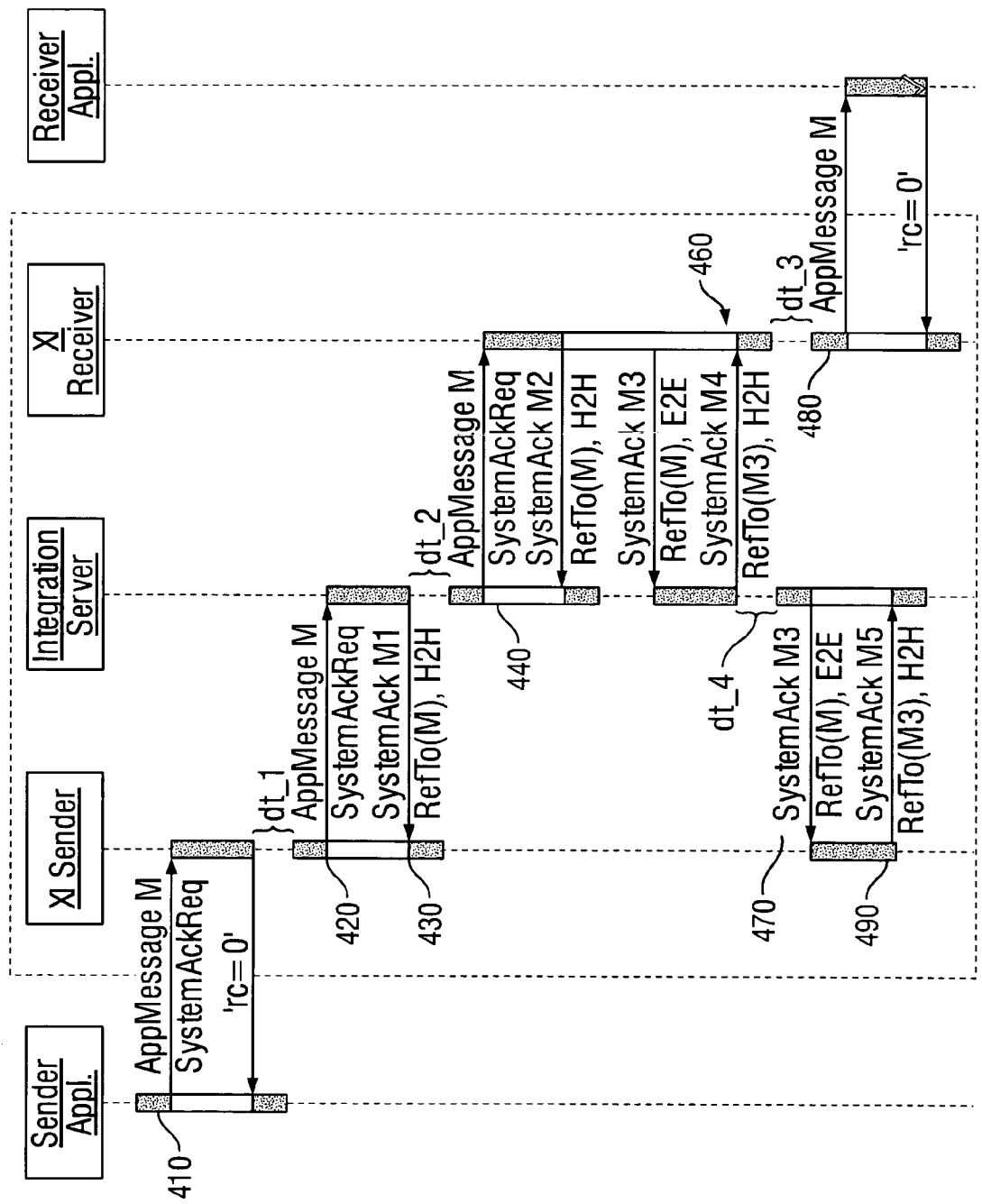
FIG. 4 is a diagram of a system for acknowledgements.
Figure 5:
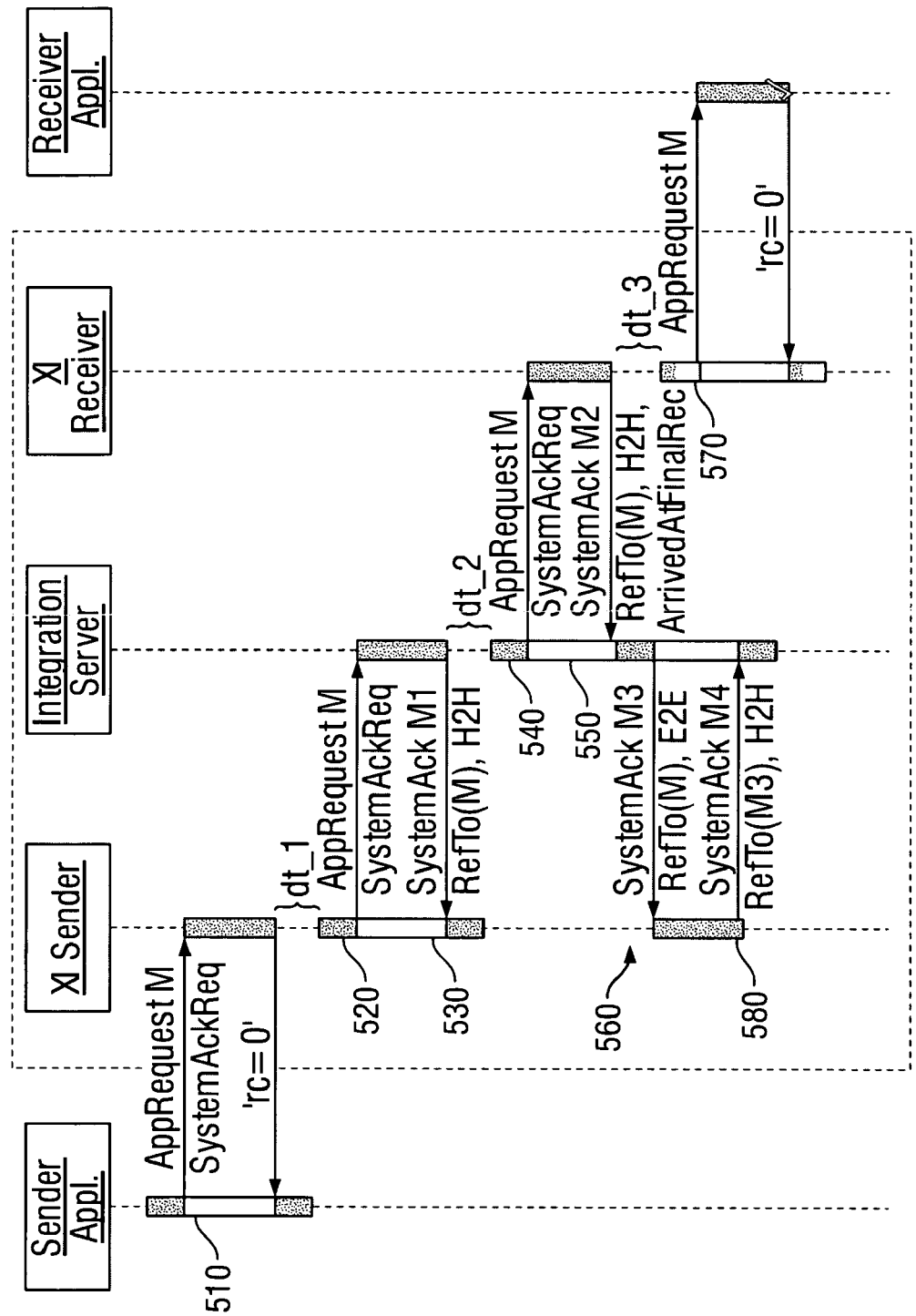
FIG. 5 is a diagram of a system for acknowledgements.
Like reference numerals and designations in the drawings indicate like elements.

FIGS. 4 and 5 illustrate two alternative methods of processing a system acknowledgement message. Note that in FIG. 5, one asynchronous message from the final receiver to the corresponding integration server is avoided and, therefore might be considered more efficient. In relation to FIGS. 4 and 5, H2H signifies hop-to-hop; E2E signifies end-to-end (i.e. from the sender to the receiver); AppRequest and AppMessage refer to an original message sent from a sender to a receiver; Sender Appl signifies sender application and Receiver Appl signifies receiver application; the dotted box encloses messaging peers; XI sender refers to a messaging peer corresponding to the sender application and XI receiver refers to a messaging peer corresponding to the receiver application; an integration server is a type of messaging peer; and, RefTo( ) signifies a reference to the message identified within the parenthesis.

In FIGS. 4 and 5, a message is sent from the sender application to its corresponding messaging peer (410 and 510). The messaging peer sends the message to a next messaging peer (i.e. the integration server) (420 and 520), which sends a hop-to-hop acknowledgement back to the messaging peer to indicate that the hop successfully received the message (i.e. the next messaging peer successfully received the message) (430 and 530). Then, that messaging peer sends the application message to a next messaging peer (i.e. the XI receiver) (440 and 540). Because this messaging peer is the final messaging peer in the messaging landscape (i.e. the dotted box), and the message was received, a system acknowledgement message is generated. The difference between FIG. 4 and FIG. 5 is that in FIG. 4 an additional hop-to-hop acknowledgement is sent at 450, whereas that acknowledgement is included in the system acknowledgement message at 550 in FIG. 5. Because a hop list was generated when sending the message to the receiving application, the system acknowledgement message is directed back along that the messaging peers that were in the hop list (450, 470, 550, and 560) and corresponding hop acknowledgements may be generated for each peer along the way (460, 490, and 580). The application message is finally received at the receiving application at 480 and 570. In alternative implementations the message need not be an application message and the acknowledgement need not be a system acknowledgement message; thus other messages may follow the same technique of asynchronous end-to-end acknowledgement.

SOAP Fault Messages

A Simple Object Access Protocol (SOAP) fault message is one type of message that may correspond to an error, and generally corresponds to an error related to the processing of a message by a messaging peer that relays a message, rather than a sending or receiving application of a message. A SOAP fault message may include a single tag—e.g. fault—and that tag may have several attributes that explain the circumstances surrounding the error. The single tag may be a component of the message, and may be part of the message body or message header. If the tag is part of a message header, the tag may define a sub-header. A SOAP fault message may be created for any of a number of reasons, including errors processing a message, errors processing attachments, parsing errors, or errors in generating a response message (i.e. a message that responds to another message, e.g. ApplicationResponse or ApplicationError). However, the SOAP fault message may be limited to certain situations, such as SOAP protocol errors, messaging protocol parsing errors; and messaging protocol rendering errors. In these scenarios, other types of error messages may be used, in addition to or instead of SOAP fault messages.

Depending on the error, the messaging protocol may require that certain attributes of a SOAP fault message be set. For example, if the error is related to a parsing error or an error in generating a response message, the messaging protocol can define that a code (i.e. fault code) corresponding to the error may be set and that an actor (i.e. fault actor) corresponding to the error be identified (i.e. the messaging peer that generated an error). In addition, an attribute called "detail" may be set that explains the error. This attribute may a string such as "unable to parse line 15." The fault code may be intended for use by software to provide a mechanism for identifying a fault. To that end, fault codes may be predefined for the messaging protocol. The fault codes may extend error codes already used by adopted protocols, such as SOAP. One example of a fault code is the code "DUPLICATE_DETECTED" that signifies a duplicate of a message was detected at a messaging peer. The fault actor may be a unique identifier of a messaging peer that generated the fault message. The fault actor attribute might not be required if the intended receiver generated the fault message, because the receiver may be determined to have generated a fault if no fault actor was specified. The detail attribute may have certain rules that apply for encoding the reason of a fault, which ensures a uniform format of the reasons for a fault.

Security

Many business scenarios demand a secured process for exchanging messages. Sometimes messaging may be sufficiently secure if a transport line is secured through HTTPS. In other cases, for example, in business-to-business scenarios, security measures may be required at the message level, instead of or in addition to the transport line, in order to accomplish non-repudiation, confidentiality, and data integrity. Message-level security includes digital signatures and digital envelopes (i.e. encryption), which may go beyond transport-level security by ensuring different aspects of security from a sender to a receiver, beyond security of the communication segments along which a message may travel. The security information of a message may be defined in a header, sub-header, and/or a body of the message.

For message level encryption and signature, the messaging protocol adopts encryption and signature standards, such as the Web Service Security Standard (WSSS), which is based on the standards XML Encryption and XML Signature. One implementation of the messaging protocol may adopt a restricted version of XML Signature, which includes a simplistic configuration of the following:

1) Signing of the message header, i.e. the main message header may be signed for authentication and data integrity purposes. Signing the message header may secure address information and message identity. The main header can be signed as a whole, rather than in parts.

2) Signing of the payload (i.e. a portion of a message that may be an attachment or other data, separate from the header, that can be used by a receiver application and may include, for example, business data for the receiver application to use while executing a message). The payload may be signed for non-repudiation purposes. The payload can be signed as a whole. In alternative implementations, parts of the payload may be signed.

The messaging protocol may define that both the main message header and the payload should be signed or unsigned together. This may ensure consistency of security, as signing only the payload or only the main message header without the other might not be adequate security.

The messaging protocol may include a security message header. Within the security header, one or two signatures (i.e. a signature for the header and a signature for the payload) may be specified. The security header may include the following elements:

1) A security token that includes the type of credential used by the signing entity (e.g. the sending application). The security token may include, for example, usernames and certificates.

2) A signature element (e.g. a tag in XML) that includes all the information necessary for the signature, such as a description of the signed information, a value representing the signature, and a reference to the security token that is used as a key.

References from the security header to other parts of the message may be expressed by referring to attributes that identify the referenced elements (e.g., wsu:Id=" ... " where the identity of the attributes is included in the quotes).

For payload signatures, a message in accordance with the messaging protocol may be considered a MIME document, thus each payload (e.g. each attachment of a message) may be encoded as a MIME part and may be identified by an identification attribute in a message manifest (i.e. a part of the message that catalogues all the payloads of a message). In order to describe the technique that was used to generate a signature of the payloads of a message such that the message may be properly interpreted by a receiving application, the technique that was used to perform a transformation may be declared in a security header and that declaration may include references to message payloads. Any technique may be used to perform the transformation. Given a private key, the technique of performing a transformation that results in signed message payloads may include the following, for each payload:

1. Computing a hash value for a payload MIME part (i.e. computing a digest for a message attachment) (e.g. the using the Secure Hashing Algorithm (SHA) Base64_encode(SHA1 (binary attachment data), where "binary attachment data" is a binary version of the MIME part).

2. Inserting the hash value (i.e. the value computed at (1.)) in a manifest of a message.

3. Computing a digital signature for the manifest (i.e. the component that includes the hash value for each of the MIME parts) based on the private key.

Given a public key, the receiver may perform the following to check the authenticity of a signature:

1. Decrypting the digital signature based on the public key. The decryption results in a manifest element containing the previously computed hash value for a MIME part (i.e. this decryption should result in the MIME part that was sent that includes the hash value).

2. Computing the hash value of the MIME parts according to the transformation used to generate the signature of the payloads.

3. Comparing the hash value in the manifest element with the hash value computed at (2.) to see if the hash values are equal.

Using this technique, the receiving application may determine that, if the hash values are not equal, the message might not be authentic and thus the message might be considered corrupt (e.g. the message or the address information in the message might have been changed). Otherwise, the receiving application may consider the message authentic.

Although a few implementations have been described in detail above, other modifications are possible. Other implementations may be within the scope of the following claims.

The invention claimed is:

1. A method of transporting a message from a sending application to a receiving application, across a messaging landscape in a collaborative network, the method comprising:
   defining an application message having a structured application message header, the structured message header being defined in accordance with a message class of the application message determinative of content and configuration of the message header and in accordance with a messaging protocol of a business application of a collaborative business enterprise, the structured message header comprising one or more components defined by the protocol and based on the message class with each of the one or more components relating to a corresponding set of attributes of the message, at least one of the one or more components of the structured header including information related to:
      a processing mode for the message, the processing mode having one of a multiple of values indicative of whether a reply responsive to the application message is to be transmitted to the sending application upon processing of the application message by the receiving application,
      a modifiable hop-list to record the identity of the intermediate components through which the application message passes en route to the receiving application, and
      security for components of the message;
   sending the message according to the protocol, from the sending application; and
   receiving, at the receiving application, the message;
   wherein the message class having one of multiple possible values including: a first value representative of an application-message class associated with application messages that cause specified operations to be performed at the receiving application, a second value representative of an application-response class associated with messages responsive to the application messages of the application-message class, a third value representative of an application-error class associated with error messages indicative of errors occurring at the receiving application processing the application messages and a fourth value representative of a system-acknowledge class associated with acknowledgement messages indicative that one or more application messages have been received by the receiving application.

2. A method in accordance with claim 1, wherein the method further comprises:
   defining the message to include a message body, wherein the message body is defined in accordance with the protocol, the message body comprises at least one component from a second set of components defined by the protocol, and the protocol defines the second set of components to comprise:

a fault message component representing an error occurring at a messaging peer that generated the error.

3. A method in accordance with claim 2, wherein the fault message is defined to represent at least one error from a set of errors and the protocol defines the set of errors to comprise:
   errors processing a message;
   errors parsing a message; and
   errors rendering a message.

4. A method in accordance with claim 1, wherein the security for components of the message is defined to comprise:
   information related to a signature of the message; and
   information related to a signature of a payload of the message, if the message includes the payload.

5. The method of claim 1 wherein the messaging protocol of the business application to manage and control the business enterprise is different from standard network communications protocols.

6. The method of claim 1 wherein the structured application message header comprises:
   a structured application message header specified using XML syntax.

7. The method of claim 1 wherein the structured application message header is specified in a designated header section of a Simple Object Access Protocol (SOAP) message.

8. The method of claim 1 wherein the application-response class associated with messages responsive to the application messages of the application-message class is associated with messages comprising return values responsive to respective computations performed by the receiving application in response to requests in the application messages received from the sending application.

9. A system to transport a message from a sending application to a receiving application across a messaging landscape in a collaborative network, the system comprising:
   at least one processor connected to the network; and
   at least one storage device coupled to the at least one processor, the at least one storage device storing computer instructions that, when executed on the at least one processor, cause the at least one processor to:
   define an application message having a structured application message header, the structured message header being defined in accordance with a message class of the application message determinative of content and configuration of the message header and in accordance with a messaging protocol of a business application of a collaborative business enterprise, the structured message header comprising one or more components defined by the protocol and based on the message class with each of the one or more components relating to a corresponding set of attributes of the message, at least one of the one or more components of the structured header including information related to:
   a processing mode for the message, the processing mode having one of a multiple of values indicative of whether a reply responsive to the application message is to be transmitted to the sending application upon processing of the application message by the receiving application,
   a modifiable hop-list to record the identity of the intermediate components through which the application message passes en route to the receiving application, and
   security for components of the message; and
   send the message from the sending application according to the protocol, the message being received at the receiving application; and wherein the message class having one of multiple possible values including: a first value representative of an application-message class associated with application messages that cause specified operations to be performed at the receiving application, a second value representative of an application-response class associated with messages responsive to the application messages of the application-message class, a third value representative of an application-error class associated with error messages indicative of errors occurring at the receiving application processing the application messages and a fourth value representative of a system-acknowledge class associated with acknowledgement messages indicative that one or more application messages have been received by the receiving application.

10. The system of claim 9, wherein the computer instructions stored on the at least one storage device further cause, when executed, the at least one processor to:
   define the message to include a message body, wherein the message body is defined in accordance with the protocol, the message body comprises at least one component from a second set of components defined by the protocol, and the protocol defines the second set of components to comprise:
   a fault message component representing an error occurring at a messaging peer that generated the error.

11. The system of claim 10, wherein the fault message is defined to represent at least one error from a set of errors and the protocol defines the set of errors to comprise:
   errors processing a message;
   errors parsing a message; and
   errors rendering a message.

12. The system of claim 9, wherein the security for components of the message is defined to comprise:
   information related to a signature of the message; and
   information related to a signature of a payload of the message, if the message includes the payload.

13. The system of claim 9, wherein the structured application message header is specified in a designated header section of a Simple Object Access Protocol (SOAP) message.

14. The system of claim 9, wherein the application-response class associated with messages responsive to the application messages of the application-message class is associated with messages comprising return values responsive to respective computations performed by the receiving application in response to requests in the application messages received from the sending application.

15. A computer program product residing on at least one computer readable storage device and comprising computer instructions that when executed on at least one processor-based device cause the at least one processor-based device to:
   define an application message having a structured application message header, the structured message header being defined in accordance with a message class of the application message determinative of content and configuration of the message header and in accordance with a messaging protocol of a business application of a collaborative business enterprise, the structured message header comprising one or more components defined by the protocol and based on the message class with each of the one or more components relating to a corresponding set of attributes of the message, at least one of the one or more components of the structured header including information related to:
   a processing mode for the message, the processing mode having one of a multiple of values indicative of whether a reply responsive to the application message is to be transmitted to the sending application upon processing of the application message by the receiving application, a modifiable hop-list to record the identity of the intermediate components through which the application message passes en route to the receiving application, and security for components of the message; and send the message from the sending application according to the protocol, the message being received at the receiving application; and wherein the message class having one of multiple possible values including: a first value representative of an application-message class associated with application messages that cause specified operations to be performed at the receiving application, a second value representative of an application-response class associated with messages responsive to the application messages of the application-message class, a third value representative of an application-error class associated with error messages indicative of errors occurring at the receiving application processing the application messages and a fourth value representative of a system-acknowledge class associated with acknowledgement messages indicative that one or more application messages have been received by the receiving application.

16. The computer program product of claim 15, further comprising instruction that, when executed, further cause the at least one processor to:

define the message to include a message body, wherein the message body is defined in accordance with the protocol, the message body comprises at least one component from a second set of components defined by the protocol, and the protocol defines the second set of components to comprise:

a fault message component representing an error occurring at a messaging peer that generated the error.

17. The computer program product of claim 16, wherein the fault message is defined to represent at least one error from a set of errors and the protocol defines the set of errors to comprise:

errors processing a message;
errors parsing a message; and
errors rendering a message.

18. The computer program product of claim 15, wherein the security for components of the message is defined to comprise:

information related to a signature of the message; and
information related to a signature of a payload of the message, if the message includes the payload.

19. The computer program product of claim 15, wherein the structured application message header is specified in a designated header section of a Simple Object Access Protocol (SOAP) message.

20. The computer program product of claim 15, wherein the application-response class associated with messages responsive to the application messages of the application-message class is associated with messages comprising return values responsive to respective computations performed by the receiving application in response to requests in the application messages received from the sending application.

* * * * *